United States Patent
Deokar et al.

(10) Patent No.: US 9,041,671 B2
(45) Date of Patent: May 26, 2015

(54) ADAPTIVE TOUCH SENSOR CONTROL BASED ON IDENTIFICATION OF ATTACHED ACCESSORY

(71) Applicant: Motorola Mobility LLC, Libertyville, IL (US)

(72) Inventors: Itisha C Deokar, Buffalo Grove, IL (US); Dale F Bengtson, Crystal Lake, IL (US); Chris J Grivas, Crystal Lake, IL (US); Michael F Olley, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 316 days.

(21) Appl. No.: 13/795,286

(22) Filed: Mar. 12, 2013

(65) Prior Publication Data

US 2014/0267059 A1    Sep. 18, 2014

(51) Int. Cl.
G06F 3/041      (2006.01)
G06F 3/044      (2006.01)
H02J 7/00       (2006.01)

(52) U.S. Cl.
CPC ............ *G06F 3/0416* (2013.01); *G06F 3/0418* (2013.01); *G06F 3/044* (2013.01); *H02J 2007/0096* (2013.01)

(58) Field of Classification Search
CPC .............. G06F 3/0488; G06F 3/04883; G06F 3/04886; G06F 3/044; G06F 3/045; G06F 3/0412; G06F 3/0416; G06F 3/046; G06F 3/03547; G06F 1/1626
See application file for complete search history.

(56) References Cited

U.S. PATENT DOCUMENTS

| 4,698,461 A | 10/1987 | Meadows et al. |
| 6,961,015 B2 | 11/2005 | Kernahan et al. |
| 7,383,453 B2 | 6/2008 | Youngs |

(Continued)

FOREIGN PATENT DOCUMENTS

| CN | 102841715 A | 12/2012 |
| DE | 202012101394 U1 | 7/2012 |

OTHER PUBLICATIONS

International Search Report and Written Opinion mailed Jul. 1, 2014 in corresponding International Application No. PCT/US2014/013495.

(Continued)

*Primary Examiner* — Andrew Sasinowski
*Assistant Examiner* — Mihir Rayan
(74) *Attorney, Agent, or Firm* — Morris & Kamlay LLP

(57) ABSTRACT

A rechargeable touch sensor equipped device (102) is adapted to identify (1008) each of multiple external charging devices (118, 120, 122, 602) by an ID or other information received through an interface (230, 630) or to infer the identity (1020) based on location information derived from received wireless signals, the time and/or day. The rechargeable touch sensor equipped device (102) determines (1026) and records (1028) a touch screen operating frequency to be used when coupled to each external charging device (118, 120, 122, 602) at each battery charge state (or other indication of power draw) and in this way mitigates the adverse effect of variable charger generated noise on the operation of the touch screen.

20 Claims, 6 Drawing Sheets

(56) References Cited

U.S. PATENT DOCUMENTS

| | | | |
|---|---|---|---|
| 7,821,501 B2 | 10/2010 | Felder | |
| 8,054,090 B2* | 11/2011 | Philipp et al. | 324/684 |
| 2007/0123304 A1* | 5/2007 | Pattenden et al. | 455/557 |
| 2007/0252554 A1* | 11/2007 | Feng et al. | 320/116 |
| 2011/0063993 A1 | 3/2011 | Wilson et al. | |
| 2011/0157069 A1 | 6/2011 | Zhuang et al. | |
| 2012/0050213 A1 | 3/2012 | Bokma | |
| 2012/0268415 A1* | 10/2012 | Konovalov et al. | 345/174 |
| 2012/0306803 A1 | 12/2012 | Kuo | |
| 2013/0121031 A1* | 5/2013 | Sims | 363/15 |

OTHER PUBLICATIONS

European Commission, "Technical Annex to MoU Regarding the Harmonization of a Charging Capability for Mobile Phones", http://ec.europa.eu/enterprise/sectors/rtte/files/chargers/chargers_annex_ii_to_mou_january_12_2010_en.pdf, Jan. 12, 2010, 28 pages.

Jay Carlson, "230V AC to 5V DC Converter, Lossless", http://electronics.stackexchange.com/question/41938/230v-ac-to-5v-dc-converter-lossless, Sep. 23, 2012, 4 pages.

* cited by examiner

FREQUENCY SELECTION SUB-PROCESS

ADAPTIVE TOUCH SENSOR CONTROL BASED ON IDENTIFICATION OF ATTACHED ACCESSORY

FIELD OF THE DISCLOSURE

The present disclosure relates generally to rechargeable touch sensor equipped devices.

BACKGROUND

Portable rechargeable touch sensor equipped devices have recently proliferated. Such devices include, by way of non-limitive example, smartphones, tablet computers, remote controllers, gaming controllers, and laptop computers. In these touch sensor equipped devices, the touch sensor is usually transparent and overlies a display to form a touch screen. In a laptop computer, a touch sensor has been used in the touchpad and is more recently used in a touch screen as well. While there are many other touch sensor technologies including acoustic, optoelectronic, and resistive, at present capacitive touch sensors are most commonly used in rechargeable touch sensor equipped devices.

In a capacitive touch sensor, a high frequency signal is successively applied to each of a set of conductive areas of the touch sensor. Contact or proximity of a person's finger to one of the conductive areas establishes or enhances a capacitive circuit which affects the amplitude of the high frequency signal applied to the conductive area. By sensing changes in the amplitude or the current of the high frequency signal, the person's touch may be inferred, which is to say sensed.

External battery chargers commonly used for rechargeable touch sensor devices, such as tablet computers and smartphones, generally use switched mode power supplies. In a switched mode power supply, a circuit through a primary side of a transformer is interrupted by a switch operated at high frequency thereby inducing a current in the secondary side of the transformer. Compared to traditional linear power supplies, switched mode power supplies are lighter and less expensive; however, they produce high frequency noise.

It is often the case that touch screen devices are used while coupled to a charger. While the charger is coupled, it will often generate a noise spectrum that overlaps with the fundamental frequency or higher frequency components of the above mentioned high frequency signal used by the capacitive sensor. The noise spectrum produced by the charger creates background noise distributed over the touch sensor effectively reducing the sensitivity of the touch sensor. To make matters worse the battery charge controller, which is a module internal to the rechargeable device, demands different amounts of current from the external battery charger depending on the charge state of the batteries of the rechargeable device, and in order to provide such variable amounts of current the external battery charger will vary either a switching frequency or a pulse width of a switched power signal and either of these changes will alter the above mentioned noise spectrum generated by the external charger, such that one cannot rely on contending with a fixed noise spectrum.

Furthermore, many different external chargers, produced by different companies and of different design are available for many rechargeable touch sensor equipped devices, and generally speaking each different external charger will produce a different noise spectrum that may vary in a different manner as a function of battery charge state.

For the designer of the rechargeable touch sensor equipped device (e.g., smartphone, tablet computer, remote controller, gaming controller, laptop computer) the variability of the noise spectrum produced by external chargers makes it difficult to design a touch sensor that is immune to such noise. Thus, there is an opportunity for a rechargeable touch sensor equipped device in which the touch sensor is less susceptible to noise generated by external chargers.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

According to certain embodiments, a rechargeable touch screen equipped device (RTSEDs) is configured to determine the identity of external devices from which the RTSED draws power in order to recharge internal batteries. The identity of the external devices can be determined based on information received through an interface, measurements of signals received through the interface, inferred from location information deduced by processing received wireless signals, and/or inferred from the time of day. External devices of different design produce spectral noise distributions that are different from each other and different depending on the power being drawn from the external device by the RTSED. An RTSED is also configured to read at least one measure indicative of power being drawn by the RTSED from the external device. The RTSED is further adapted to determine a suitable operating frequency for its touch screen corresponding to each external device and for each inferred level of power being drawn by the RTSED from the external device. After the suitable frequencies have been determined the RTSED can select the suitable frequency based on the identification of a coupled external device and based on the one or more measurements indicative of power being drawn by the RTSED.

Figure 1:
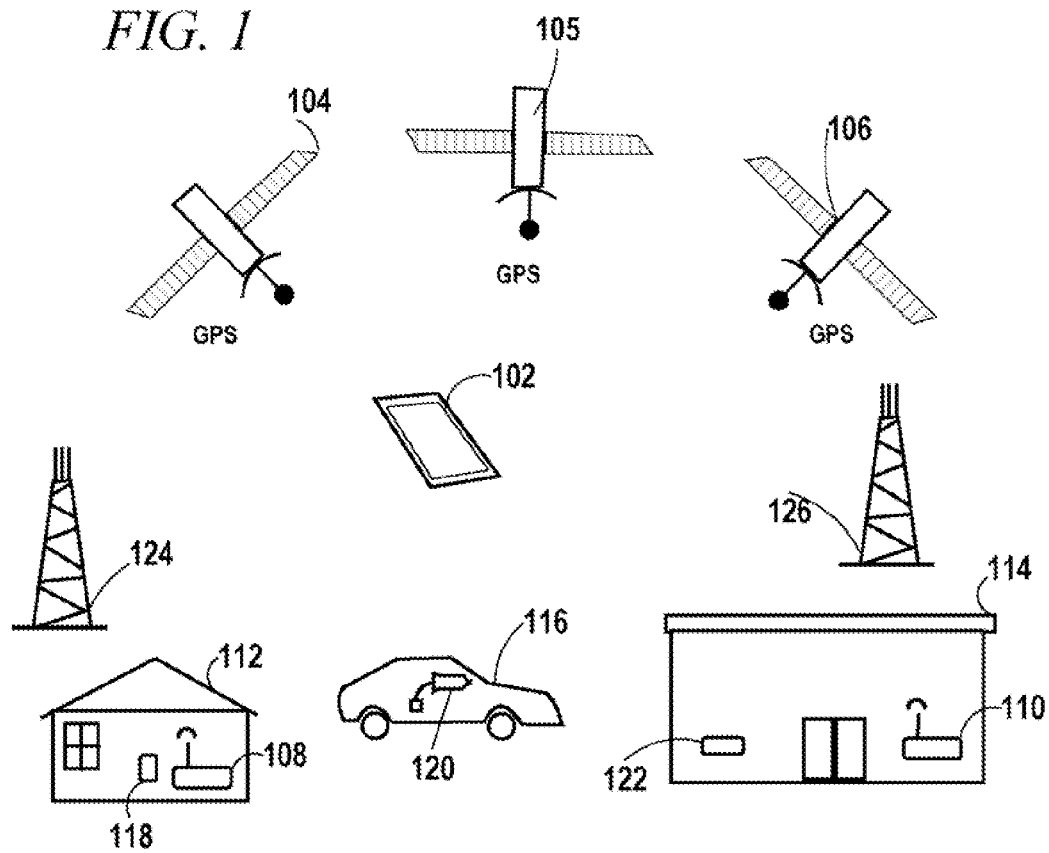
FIG. 1 is schematic representation of a rechargeable touch sensor equipped device (RTSED) set among geographically separated locations in which it is used and showing various wireless devices with which it can connect.

FIG. 1 is schematic representation of a rechargeable touch sensor equipped device (RTSED) 102 set among geographically separated locations in which it is used and showing various wireless devices 104, 105, 106, 108, 110 with which the RTSED 102 can connect. The RTSED 102 is depicted in FIG. 1 as a smartphone or tablet computer; however, alternatively the RTSED 102 can be another type of device such as a laptop computer, remote controller, gaming controller, or other rechargeable device having a touch sensor.

According to certain embodiments of the invention the RTSED 102 is equipped with one or more wireless signal receivers, which can be included in one or more transceivers 210 (FIG. 2) or be provided without accompanying transmitters. In certain embodiments the RTSED 102 includes a satellite signal receiver for receiving signals from global positioning system satellites, which may be part of the proper named Global Positioning System or competing systems such as the Global Navigation Satellite System (GLOSSNASS), the Compass Navigation System, the Indian Regional Navigation Satellite System (IRNSS), or other systems. FIG. 1 shows a first GPS satellite 104, a second GPS satellite 105, and a third GPS satellite 106 from which the RTSED 102 can receive signals. While only three satellites are shown in FIG. 1 in practice more satellites are provided. By processing signals from the GPS satellites 104, 105, 106 the RTSED 102 can deduce its location. In certain embodiments the RTSED 102 includes a wireless transceiver 210 (FIG. 2) (or at least receiver) through which the RTSED 102 can receiver cellular site (e.g., base station) ID information. In FIG. 1 a first base station 124 and a second base station 126 from which the RTSED 102 can receive ID information are shown.

In certain embodiments the RTSED 102 includes a wireless transceiver 210 (FIG. 2) (or at least receiver) through which the RTSED 102 can receive network ID information. In FIG. 1 a first wireless router 108 is located in a home 112 and a second wireless router 110 is located in an office building 114. The wireless transceiver 210 of the RTSED 102 is able to receive signals including network ID information from the first wireless router 108 and the second wireless router 110.

An automobile 116 is also shown in FIG. 1. The RTSED 102 may be transported and used in the automobile 116. For example in the case of a smartphone embodiment, the RTSED 102 may be placed in a dashboard mounted bracket (not shown) and used as a turn-by-turn GPS navigation device.

A first battery charger 118 is located in the home 112, a second battery charger (a 'car charger') 120 is located in the automobile 116 and a third battery charger 122 is located in the office building 114. Typically one charger would be sold with the RTSED 102 and a user would then purchase additional aftermarket chargers. We will initially assume that each of the chargers used with a particular RTSED has a different design and therefore produces different noise spectra as discussed in the background section.

In some cases both the RTSED 102 and one or more of the battery chargers 118, 120, 122 implement an interface standard which provides for the sending of identifying information from the battery charger 118, 120 and/or 122 to the RTSED 102. The identifying information can comprise identification of a manufacturer, identification of a model and/or a unique serial number.

In certain embodiments the RTSED 102 will infer and ascribe an identity to a battery charger (e.g., 118, 122) located in the vicinity of a wireless router (e.g., 108, 110) based on a network ID received from the wireless router (e.g., 108, 110). Similarly, in certain embodiments the RTSED 102 will infer and ascribe an identity to a battery charger (e.g., 118, 122) located in the vicinity of a base station (e.g., 124, 126) based on a cellular site ID received from the base station (e.g., 124, 126).

In certain embodiments the RTSED 102 will infer and ascribe an identity to a battery charger (e.g., 118, 122) based on GPS coordinates of the RTSED 102 when coupled to the battery charger (e.g., 118, 122). Additionally the RTSED 102 can infer and ascribe an identity to the battery charger 120 located in the automobile 116 based on the fact that GPS coordinates vary while the RTSED 102 is coupled to the battery charger 120 in the automobile 116. Similarly the RTSED 102 can infer and ascribe an identity to the battery charger 120 located in the automobile 116 based on the fact that different base stations (e.g., 124, 126) are coming into and out of range of the RTSED 102 as the automobile 116 is driven. For example, a succession of periods of connectivity with different base stations each of which has a duration of no more than a preprogrammed limit can be construed as an indication that the RTSED is in the automobile 116.

Inferring and ascribing identities to battery chargers 118, 120, 122 based on location information deduced from wireless signals is useful for identifying battery chargers that do not provide identifying information through an interface 212 (FIG. 2) that couples to the battery chargers 118, 120, 122.

Figure 2:
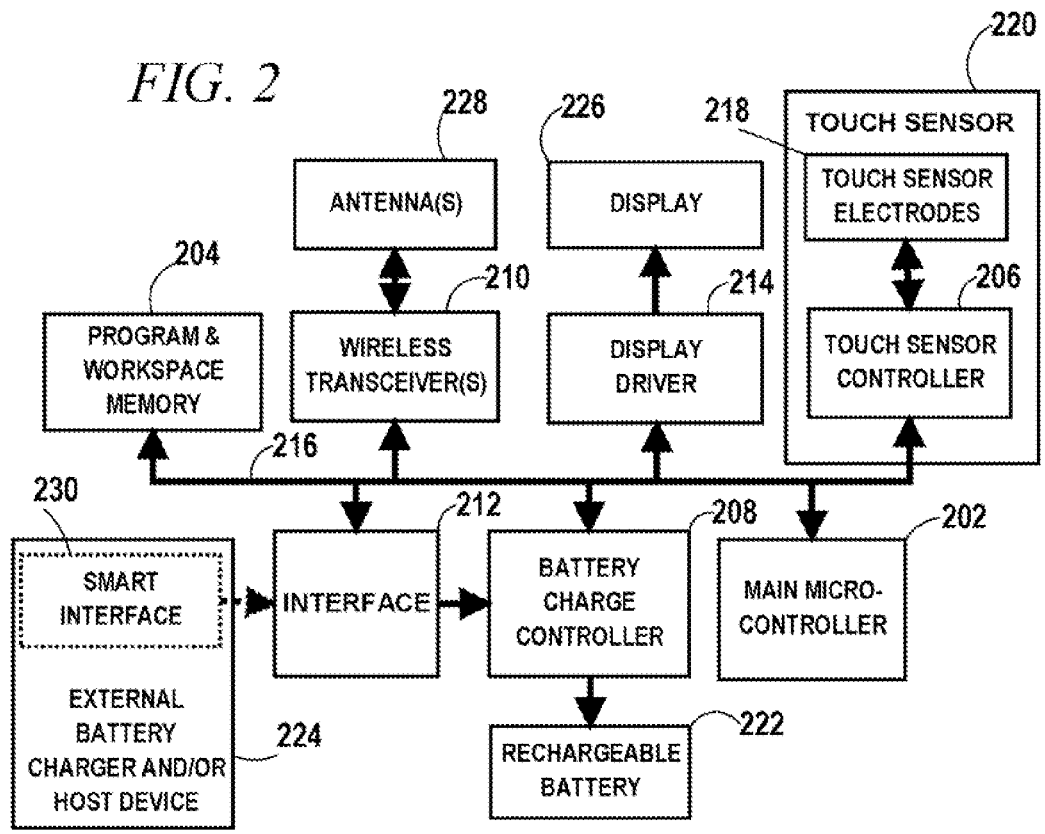
FIG. 2 is a block diagram of the rechargeable touch sensor equipped device shown in FIG. 1 according to an embodiment of the disclosure.

FIG. 2 is a block diagram of the RTSED 102 shown in FIG. 1 according to an embodiment of the disclosure. Referring to FIG. 2 the RTSED 102 includes a main microcontroller 202, a program and workspace memory 204, a touch sensor controller 206, a battery charge controller 208, one or more wireless transceivers 210, an interface 212 and a display driver 214 coupled together through a system bus 216. The program and workspace memory 204 is used to store programs that function according to the flowcharts shown in FIGS. 11-13 described below.

The touch sensor controller 206 is coupled to a set of touch sensor electrodes 218. The touch sensor controller 206 together with the touch sensor electrodes 218 are parts of a touch sensor 220. A mutual capacitance based embodiment of the touch sensor 220 is described in more detail with reference to FIG. 4.

The battery charge controller 208 is coupled to the interface 212 and to a rechargeable battery 222. The interface 212 is adapted to couple to an external battery charger and/or a host device 224. The battery charger and/or host device 224 can include a smart interface 230 that couples to the interface 212 of the RTSED 102. The battery charge controller 208 receives power through the interface 212 from the external charger and/or host device 224. According to some embodiments, the interface 212 is a Universal Serial Bus (USB) interface. The external battery charger and/or host device 224 can take the form of a dedicated battery charger or a computer that serves a secondary purpose of a peripheral device charger. For example certain computers' USB ports serve a dual purpose of supplying power to peripheral devices and these computers may be used as battery chargers. The battery charge controller 208 monitors the charge state of the rechargeable battery 222 and adjusts the current supplied to the rechargeable battery 222 based on the charge state.

The display driver 214 is drivingly coupled to a display 226. The touch sensor electrodes 218, which may be carried on a substrate 324 (FIG. 3) can be positioned over the display 226 to form a touch screen.

One or more antennas 228 serving as a free space interface for the wireless transceivers 210 are coupled to the one or more wireless transceivers 210.

Figure 3:
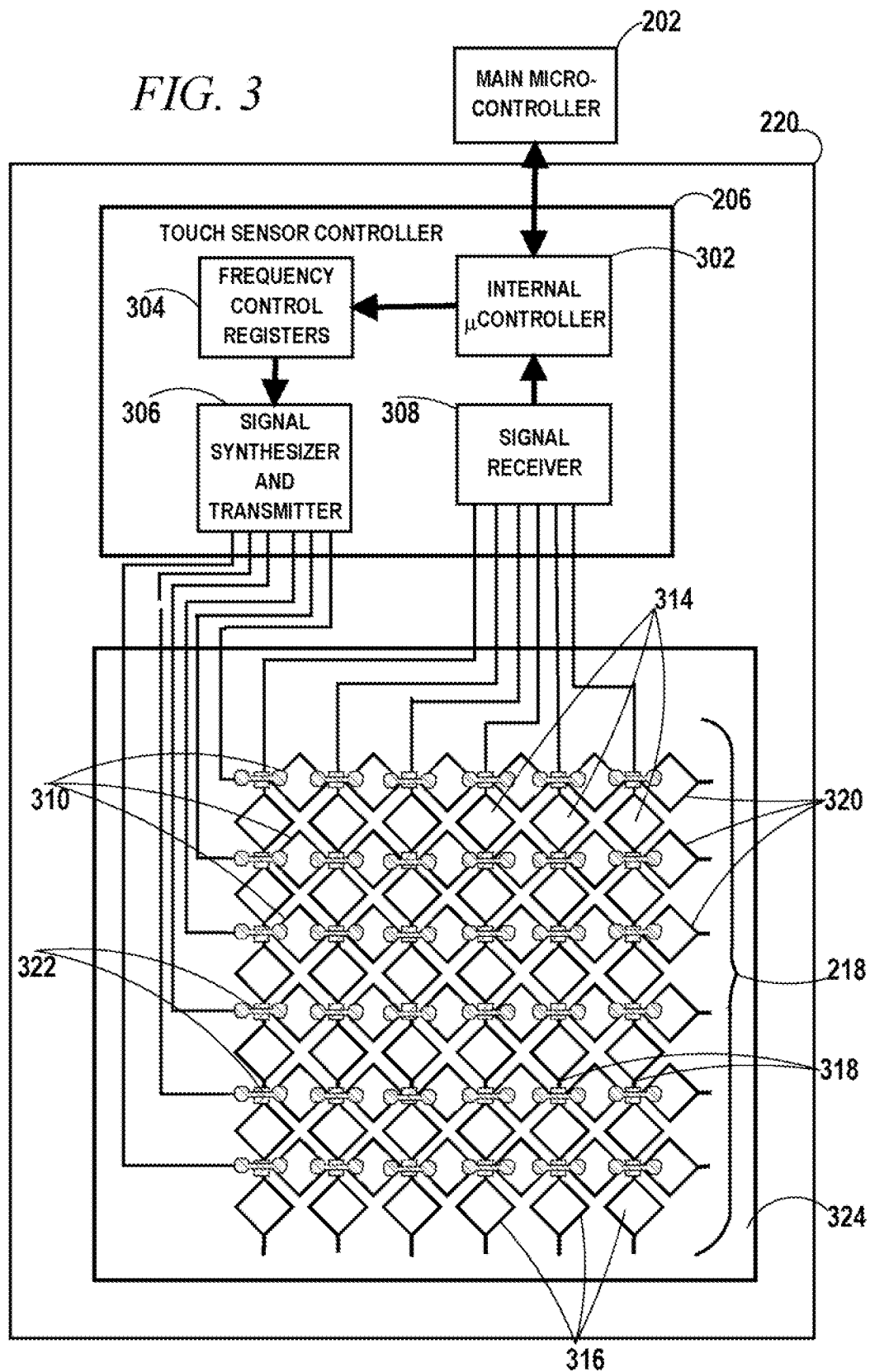
FIG. 3 is a schematic illustration of a touch sensor electrode array along with an associated touch sensor controller and a main controller of the RTSED shown in FIGS. 1 and 2 according to an embodiment.

FIG. 3 is a schematic illustration of the touch sensor 220 and the main controller 202 of the RTSED 102 shown in FIGS. 1 and 2 according to an embodiment. Referring to FIG. 3, the main microcontroller 202 of the RTSED 102 is communicatively coupled to an internal microcontroller 302 of the touch sensor controller 206. The touch sensor controller 206 also includes set of frequency control registers 304, a signal synthesizer and transmitter 306, and a signal receiver 308. The internal microcontroller 302 receives instructions from the main microcontroller 202 that specify frequencies to be used, and based on those instructions writes corresponding values to the frequency control registers 304. The signal synthesizer and transmitter 306 in turn generates signals at one or more frequencies based on the content of the frequency control registers 304. Signals generated by the signal synthesizer and transmitter 306 are sequentially applied to one of multiple (FIG. 3 shows six, but many more are implemented in most practical embodiments) horizontally extending driven electrodes 310, (In FIG. 3 where there are numerous instances of the same element, in some instances less than all of such elements are numbered to avoid crowding the drawing). Multiple (FIG. 3 shows six, but many more are implemented in most practical embodiments) vertically extending sense electrodes 314 cross the horizontally extending driven electrodes 310 perpendicularly.

Each of the vertically extending sense electrodes 314 includes a sequence of diamond shaped areas 316 connected by short traces 318. Each of the horizontally extending driven electrodes 310 includes a sequence of diamond shaped areas 320 connected by out-of-plane bridges 322 that cross over the short traces 318. In this way the horizontally driven electrodes 310 and the vertically extending sense electrodes 314 can cross without ohmically connecting.

The diamond shaped areas 320 of the horizontally extending driven electrodes 310 and the diamond shaped areas 316 of the vertically extending sense electrodes 314 are interspersed in a 2-D periodic pattern, such that each diamond 320 in each horizontally extending driven electrode 310 is proximate but not ohmically connected to multiple diamond shaped areas 316 of the vertically extending sense electrodes 314. With this arrangement signals applied to the horizontally extending driven electrodes 310 by the signal synthesizer and transmitter 306 will be capacitively coupled to the vertically extending sense electrodes 314 and sensed by the signal receiver 308 which is capable of measuring the amplitude of the received signal. The horizontally extending driven electrodes 310 and the vertically extending sense electrodes 314 are supported on a substrate 324.

Many alternative arrangements of electrodes of capacitive touch sensors are known in the art and may be used in implementing the present invention. For example, rather than diamond shaped areas, areas having a wide variety of shapes are known. Additionally while the embodiment shown in FIG. 3 contemplates that the diamond shaped areas of the drive and sense electrodes are positioned in a common plane, alternatively they can be positioned in different planes separated by a thin dielectric material. Furthermore while the embodiment shown in FIG. 3 drives the horizontally extending electrodes 310 and the vertically extending electrodes 310 sense signals, these roles can be reversed.

Figure 4:
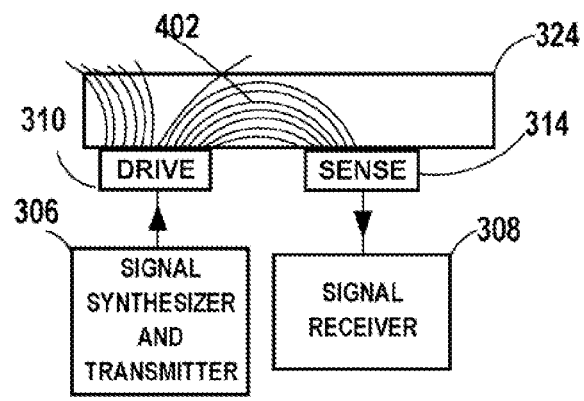
FIG. 4 is a schematic diagram illustrating the function of a mutual capacitance touch sensor when not touched.
Figure 5:
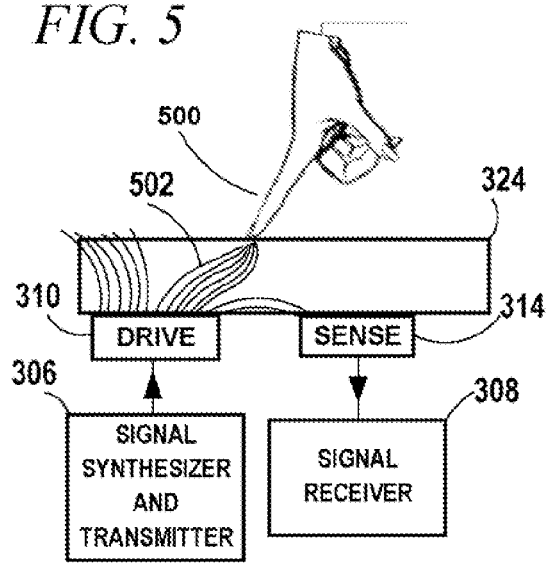
FIG. 5 is a schematic illustrating the functioning of the mutual capacitance sensor shown in FIG. 4 when touched.

FIG. 4 is a schematic diagram illustrating the function of touch sensor 220 when not touched and FIG. 5 is a schematic diagram illustrating the functioning of the touch sensor shown in FIG. 4 when touched. As shown in FIG. 4, when not touched, electric field lines 402 emanating from the drive electrodes 310 and produced by the application of a signal from the signal synthesizer and transmitter 306 cross over, through the substrate to the sense electrodes 314. These field lines vary in strength due to the oscillating nature of the applied signal and are associated with a displacement current that carries the signal through the sense electrodes 314 to reach the signal receiver 308. When as shown in FIG. 5 a user places a finger 500 on the substrate 324 a portion of the field lines 502 is diverted to the user's finger 500, thereby reducing the magnitude of the signal transferred into the sense electrode 314. If the user is holding the RTSED 102 in another hand (not shown), and in particular if the user's hand holding the RTSED touches a metal part of the RTSED 102 that is coupled to a ground plane or other circuitry of the RTSED, then the portion of the signal coupled to the user's finger 500 may be coupled back into the RTSED but without passing through the signal receiver 308.

Figure 6:
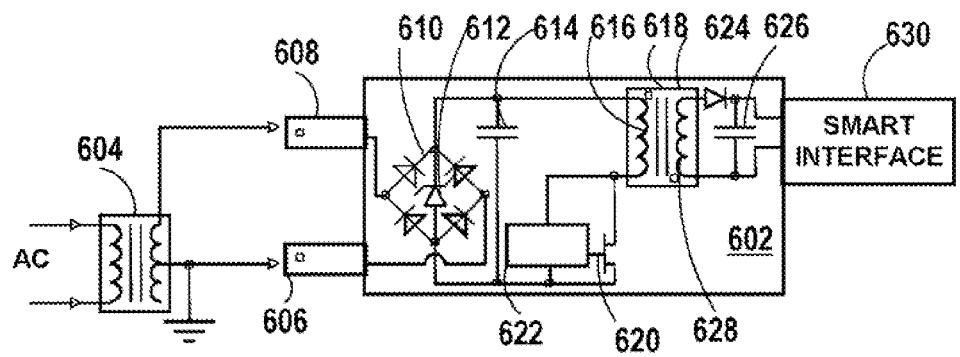
FIG. 6 is a schematic diagram of a switched mode type external battery charger coupled to a neighborhood service transformer.

FIG. 6 is a schematic diagram of a switched mode type external battery charger 602 coupled to a neighborhood service transformer 604. The external battery charger 602 is one particular embodiment of the external battery charger/host device 224 shown in FIG. 2. As noted above, one challenge in reducing the effect of external charger generated noise on touch sensor performance is the variety of designs of external battery chargers. Thus it should be appreciated that the particular circuit shown in FIG. 6 is but one design example, which is presented here in order to foster an understanding of certain aspects of the disclosure. Furthermore, even battery chargers that share the same or nearly the same circuit topology may produce distinct noise spectra due to differences in circuit component values and/or operating frequencies.

As the term is commonly used, and is used herein, "battery charger" referring to an external device that is plugged into the RTSED 102 in order to supply power for charging the RTSED 102 or simply operating the RTSED 102, in actuality is a power supply that may or may not include a smart interface that can provide identifying information to the RTSED. It is typically not, contrary to what may be implied by its name, a device that manages the charge state of the rechargeable battery 222. The task of managing the charge state of the rechargeable battery 222, including inter alia, ensuring that the rechargeable battery 222 is not overcharged, is handled by circuits internal to the RTSED 102, i.e., the battery charge controller 208.

While the external battery charger and/or host device 224 can take the form of a standalone device (e.g., 602) with the dedicated purpose of supplying electrical power for operating the RTSED 102 or charging the rechargeable battery 222 of the RTSED 102, alternatively, and in fact commonly the external battery charger and/or host device 224 can take the form of device with greater functionality for which the function of providing power for charging other devices is a minor feature. For example the external battery charger and/or host device 224 can take the form of a host device such as laptop or desktop computer equipped with a USB port capable of supply power for charging batteries of coupled devices such as the RTSED 102. In the case of a host device such as a laptop or desktop computer the power supply circuitry may be distributed throughout the host device as opposed to being together in one place as in the case of a dedicated purpose external charger. The term "battery charger" as used in the appended claims includes: a device commonly referred to as a "battery charger" (i.e., a dedicated device for supplying power to the RTSED 102 for charging the rechargeable battery 222 of the RTSED 102 or operating the RTSED 102); and a host device, such as for example a laptop or desktop computer that is adapted to supply power to the RTSED 102 for the purpose of operating and charging the rechargeable battery 222 of the RTSED 102.

Referring to FIG. 6, the battery charger 602 includes polarized plug including a neutral prong 606 and a hot prong 608. The neutral prong 606 and the hot prong 608 connect to inputs of a bridge rectifier 610. The bridge rectifier 610 has a reverse biased voltage protection diode 612 across its outputs. An input filter capacitor 614 is coupled across the output of the bridge rectifier 610. The output of the bridge rectifier 610 is also coupled through a circuit including a primary winding 616 of a transformer 618 and a power transistor 620. A pulse width modulation (PWM) controller 622 is drivingly coupled to a gate terminal of the power transistor 620. The PWM controller 622 also senses voltage on the primary winding 616 and, based on such sensing, controls the duty cycle of the power transistor 620 in order to regulate an output voltage of the battery charger 602. A circuit including a rectifying diode 624 and a output filter capacitor 626 is coupled to a secondary winding 628 of the transformer 618. In operation when the power transistor 620 is opened (switched into non-conducting state) magnetic flux which had been established when the power transistor 620 was closed (switched into a conducting state) collapses and generates a voltage in the secondary winding 628 that charges the output filter capacitor 626 through the rectifying diode 624. The voltage across the output filter capacitor 626 is equal or nearly equal to the output voltage of the battery charger 602 and is applied through a smart interface 630 to the RTSED 102 when the battery charger 602 is coupled to the RTSED 102.

While the output of the battery charger 602 is meant to be regulated to a constant voltage, current and hence power drawn is variable. In fact in the course of recharging the rechargeable battery 222 the battery charge controller 208 of the RTSED 102 will draw variable amounts of current from the battery charger 602. In order to increase the current output by the battery charger 602, the PWM controller 622 will increase the duty cycle of the power transistor 620. Altering the duty cycle consequently alters the spectrum of noise produced by the battery charger 602 and coupled through the smart interface 630 (or a standard interface) to the RTSED 102.

Figure 7:
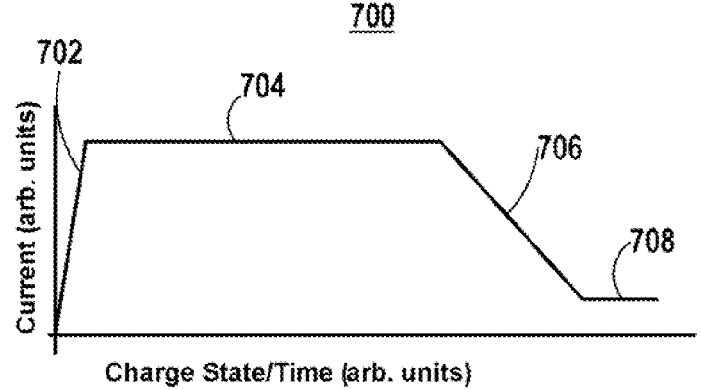
FIG. 7 is a plot of battery input current versus time when charging a rechargeable battery of the device shown in FIG. 1 according to a particular charging regimen.

FIG. 7 is a plot 700 of battery input current versus time when charging a rechargeable battery of the device shown in FIG. 1 according to a particular charging regimen. Four phases of battery charging regimen are depicted. In a first phase 702 which begins with the rechargeable battery 222 in a discharged state, the current is ramped up from zero to a predetermined level. During a second phase 704 current is maintained at the predetermined level. Through the first phase and second phase, the battery voltage is increasing. During a third phase 706 current is ramped down with the battery voltage remaining at a constant level. During a fourth phase 708 a certain current that depends on the power consumption of the RTSED will be maintained. Throughout at least the first three phases 702, 704, 706 the power required for charging the rechargeable battery will vary and therefore the power draw from the external battery charger/host device 224 will vary and consequently the noise spectrum produced by the external charger host device 224 will also vary. Thus the touch sensor 220 will be subjected to a varying noise spectrum as the rechargeable battery 222 is charged.

Figure 8:
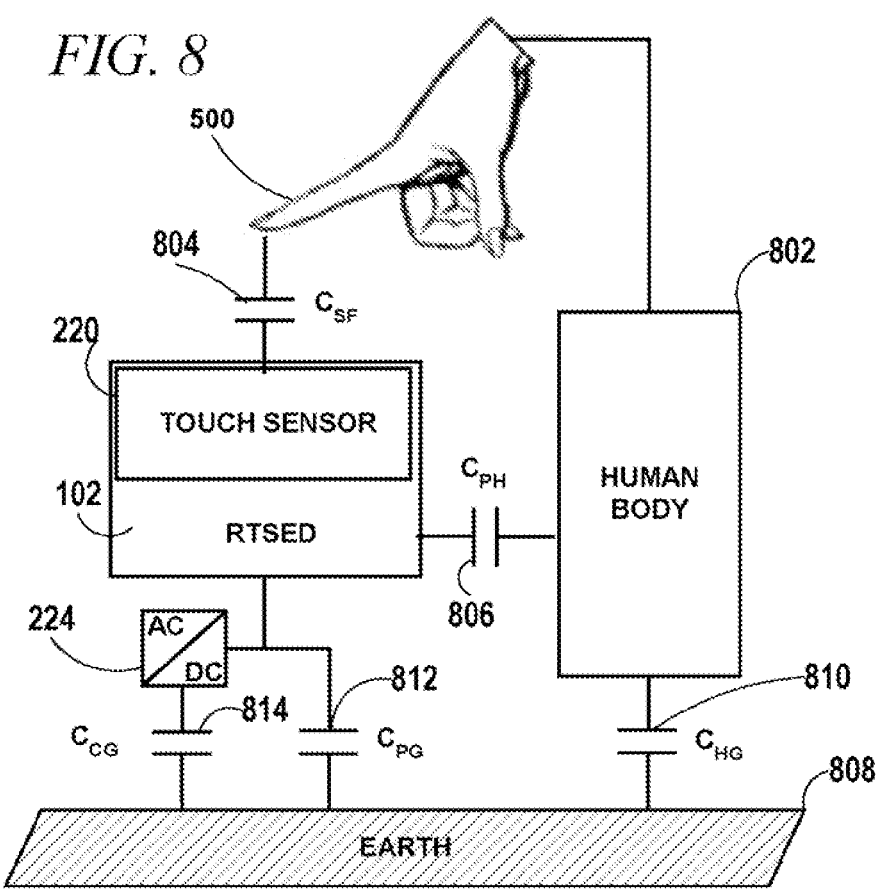
FIG. 8 is an electrical schematic of a rechargeable touch sensor equipped device coupled to an external battery charger, illustrating circuit pathways for both touch sense signals and noise signals that are established when operating the device.

FIG. 8 is an electrical schematic of a RTSED 102 coupled to the external battery charger or host device ('battery charger') 224 (e.g., 602), illustrating circuit pathways for both noise and touch sense signals that are established when operating the RTSED 102. The schematic shown in FIG. 8 shows various capacitively coupled signal pathways for signals generated by the signal synthesizer and transmitter 306 of the touch sensor 220. When the user's finger 500 touches substrate 324 (FIGS. 3-5) of the touch sensor 220 the signal can couple through the user's hand and into the user's body 802. A capacitance $C_{SF}$ 804 represents the capacitance between the user's finger 500 and the touch sensor 220. If the user is holding the RTSED 102 with the same hand or the other hand, the signal can further capacitively couple directly back into the RTSED 102 reaching a ground plane (not shown) of the RTSED 102 and bypassing the signal receiver 308. The capacitance between the user's hand holding the RTSED 102 and the RTSED is represented by capacitance $C_{PH}$ 806 in FIG. 8.

The signal can also couple from the user's body 802 to the earth 808 embodied by the actual surface on which the user is standing. A capacitance $C_{HG}$ 810 represents the capacitance between the user's body 802 and the earth 808. A capacitance $C_{PG}$ 812 represents the capacitance between the RTSED 102 and the earth 808 embodied by an object on which the RTSED 102 is placed, for example a metal table. (It is assumed that there can be a signal pathway between various things constituting electrical "earth".) The signal coupled into the user's finger 500 may also be coupled back to the RTSED 102 through the earth 808. Coupling of signals from the user's finger through capacitances $C_{PH}$ or $C_{HG}$ and $C_{PG}$ shown in FIG. 8 is part of the normal operation of the RTSED 102.

When the external battery charger/host device 224, 602 is coupled to the RTSED 102 an additional signal pathway that includes a noise source is established between the earth 808 and the RTSED 102. Noise generated by the high frequency switching of power transistor 620 of the battery charger 602 is injected into the RTSED 102 adding noise to signals received by the signal receiver 308. One parasitic pathway for such signals particularly high frequency components, is through a parasitic capacitance formed between the primary winding 616 and the secondary winding 628 of the transformer 618 of the battery charger 602. This parasitic capacitance is represented by $C_{GC}$ 814 in FIG. 8.

Figure 9:
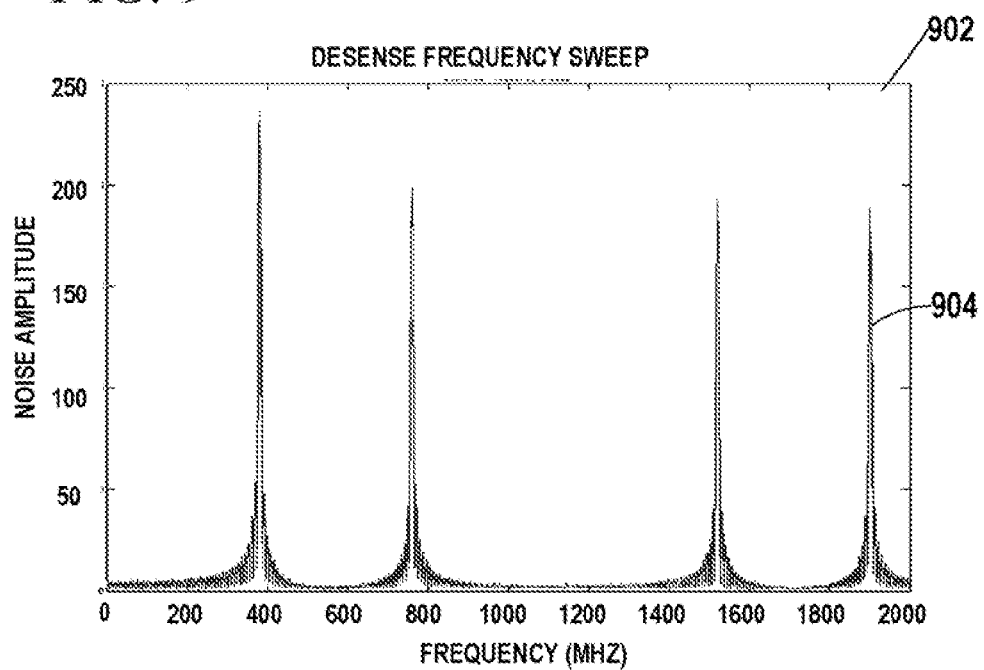
FIG. 9 is a graph including a plot of noise sensitivity versus frequency for a touch sensor operating at a particular frequency.

FIG. 9 is a graph 902 including a plot 904 of noise sensitivity versus frequency for the touch sensor 220 when operating at a particular frequency. The frequency dependence of the noise sensitivity exhibits peaks corresponding to Fourier components of the signal generated by the signal synthesizer and transmitter 306 and received by the signal receiver 308. Hence by altering the operating frequency of the touch sensor 220 the noise sensitivity spectrum can be shifted in frequency to avoid certain noise sources.

Figure 10:
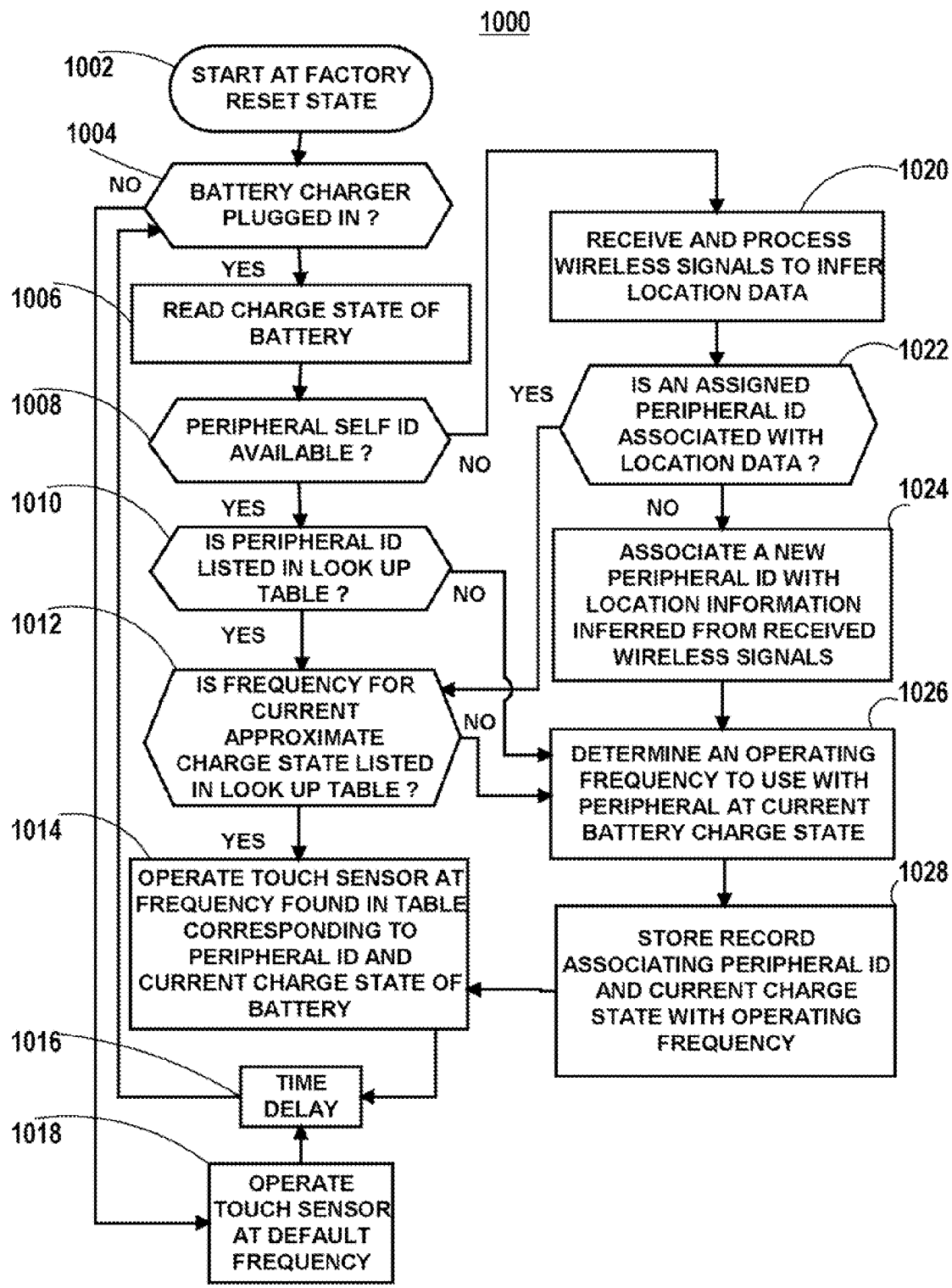
FIG. 10 is a flowchart of a program carrying out a method of operating a rechargeable touch screen equipped device according to an embodiment.

FIG. 10 is a flowchart of a program carrying out a method 1000 of operating the RTSED 102 according to an embodiment. The method starts at a factory reset state 1002. Next decision block 1004 tests if a battery charger 224, 602 is coupled to the RTSED 102. If the outcome of decision block 1004 is negative then the method 1000 branches to block 1018 in which the RTSED 102 operates the touch sensor 220 at a default frequency that is meant to be used when no battery charger 224, 602 is coupled.

If on the other hand the outcome of decision block 1004 is affirmative meaning that the RTSED 102 is coupled to a battery charger 224, 602, then the method 1000 proceeds to read 1006 the charge state of the rechargeable battery 222. The charge state may be read from the battery charge controller 208 which keeps track of the charge state. The charge state is a parameter related to the electrical charge that has been input into the rechargeable battery 222 and may be based on a stored history of current flowing into the rechargeable battery and/or one or more records of voltage of the rechargeable battery, e.g., a present voltage and one or more previous voltages.

The method 100 proceeds to decision block 1008, the outcome of which depends on whether the RTSED 102 is able to read self identifying information from the battery charger 224, 602. Certain battery chargers, such as by way of non-limitive example certain USB chargers, will provide identifying information to a host device such as the RTSED 102. If the outcome of decision block 1008 is negative meaning that the battery charger 224, 602 is not able to provide identifying information, then an alternative method of deducing the identity of the battery charger 224, 602 will be employed.

To employ the alternative method of deducing the identity, the method 1000 branches to block 1020 in which wireless signals are received and processed in order to deduce location information and the identity of the battery charger 224, 602 is inferred from the location information. While the preceding method of inferring the identity of the battery charger 224, 602 is not foolproof it is sufficient in many instances. If for example two different battery chargers 224, 602 both of which do not provide self identifying information are used at the same location then the method of construing the identity of the battery charger 224, 602 from the location information could be defeated. However, generally only one battery charger will be used to charge each RTSED at each location. According to an alternative embodiment, which can also be applied in cases where the RTSED does not have any wireless connectivity, the time of day and/or day of the week tracked by the main microcontroller 202 can be construed as indicative of identity of the coupled battery charger 224, 602. This method assumes that users follow a daily or weekly routine and habitually connect to different battery chargers at certain times and/or days of the week.

In one case the wireless signals that are received in block 1020 can be global positioning satellite signals. As is well known, such signals can be used to deduce location information. In a second case, the wireless signals that are received in block 1020 can be wireless signals that include a wireless local or personal area networking ID (an access point ID, wireless display connection ID, information identifying a paired Bluetooth device, or other wireless network device ID). The wireless local or personal area networking ID can be construed as identifying a unique location, whether or not the RTSED has access to information correlating the wireless local or personal area networking ID with a geographic location. What is important is that a certain battery charger 224, 602 will be taken to be located in the vicinity of the wireless local or personal area networking transmitter having that particular ID. For example, pairing to a Bluetooth device built into an automobile 116 may indicate that a connected charger is the car charger 120. In a third case the wireless signals that are received in block 1020 can be cellular signals that include a cellular site (e.g., base station) ID. After completing block 1020 the method 1000 proceeds to decision block 1022 the outcome of which depends on whether there is already an assigned peripheral ID associated with the location information deduced in block 1020. If not then the method 1000 proceeds to block 1024 in which a new peripheral ID is associated with the location information that has been deduced from the received wireless signals. Optionally information derived from wireless signals may be combined with other forms of information to form a peripheral ID.

In the special case of a car charger 120 that does not provide wireless local or personal area networking ID information (as ascertained in block 1008), the identity can be construed from the fact that received global positioning satellite signals indicated a varying location, from the fact that wireless routers are continually coming in and out of range of the RTSED 102 and/or from the fact that cellular base stations are coming in and out of range of the RTSED 102.

If global positioning signals were received in block 1020 and processed to obtain geographic coordinates, then in block 1024 those geographic coordinates are used as a unique peripheral ID. Accounting for noise and in order to allow for slight differences in position or orientation of the RTSED 102 when block 1020 is executed, a predetermined tolerance may be used subsequently when checking whether newly acquired geographic coordinates match those associated with the new peripheral ID.

If a wireless network router ID was received in block 1020, then in block 1024 the received wireless network ID will be used as the new peripheral ID. If a cellular site ID was received in block 1020, then in block 1024 the received cellular site ID will be used as the new peripheral ID. If a information derived from a shared Bluetooth link key was received in block 1020 then the received Bluetooth information can be used as the peripheral ID.

If the wireless signals received and processed in block 1020 indicate that the battery charger 224 is moveable than a new peripheral ID will be associated with detection of movement (either via global positioning system signals or wireless network router signals).

Referring back to decision block 1008, if the outcome had been positive meaning that the battery charger 224, 602 was able to provide a identifying information (e.g., through a USB interface) to be used as a peripheral ID, then the method 1000 proceeds to decision block 1010 which tests if the peripheral ID is listed in a look up table. A representation of the look up table is shown below:

TABLE

| CHARGE STATE | $1^{ST}$ PERIPHERAL ID (GPS coordinates) | $2^{ND}$ PERIPHERAL ID (Wireless Router ID) | ... | $N^{TH}$ PERIPHERAL ID (Identifying information received via USB interface) |
|---|---|---|---|---|
| 1 | F3 | F2 | | |
| 2 | F1 | F3 | | |
| 3 | F1 | F2 | | |
| 4 | F3 | F3 | | |
| 5 | F4 | F3 | | |
| 6 | F5 | | | |
| 7 | F9 | | | |
| 8 | F7 | | | |
| 9 | F8 | | | |
| 10 | F10 | | | |

A first column of table includes a sequence of charge states which can be integer valued or floating point valued for example. In some embodiments actual charge state values may be rounded off before attempting to match with values in the first column. Each of the other columns corresponds to a particular peripheral ID which can be either a peripheral ID read from the battery charger 224, 602 or a peripheral ID assigned based on location information. Within each column corresponding to a peripheral ID there will be a series of frequency identifying entries with each frequency identifying entry corresponding to a charge state indicated to its left in the first column. As shown some of the entries are not yet filled in, but will be filled in the course of continued execution of the method 1000.

In the alternative embodiment discussed above in which the time and or day of the week is used to identify a battery charger, the main microcontroller 202 can be programmed to detect that a battery charger that is not otherwise identifiable is repeatedly coupled to the RTSED 102 within a certain predetermined tolerance of a certain time of day during the week or on the weekend, and the main microcontroller 202 can associate a peripheral ID with this time of day, under the assumption that it is in fact the same charger, which likely to be the case.

Certain simple battery chargers may not communicate any information beyond a maximum rated current draw. If the RTSED 102 is periodically coupled to two battery chargers that communicate two different maximum rated current draws, the main microcontroller 102 may be programmed to distinguish and assign distinct peripheral ID's based at least in part on the different maximum rated current draws that are communicated.

Furthermore, if the RTSED 102 is regularly coupled to two battery chargers one of which does not communicate a maximum rated current draw, distinct peripheral ID's may be assigned to distinguish the two battery chargers. The peripheral ID's assigned based on the various above mentioned factors would then be assigned a column in the look up table represented above. More generally, any information communicated by a coupled battery charger, or any measurable characteristics of signals (e.g., current, voltage, frequency) measured specifically when coupled to the battery charger, e.g., signals received from the battery charger can be used to identify a particular battery charger, or at least to distinguish a particular battery charger from other battery chargers that are also, from time to time coupled to the RTSED 102.

Figure 11:
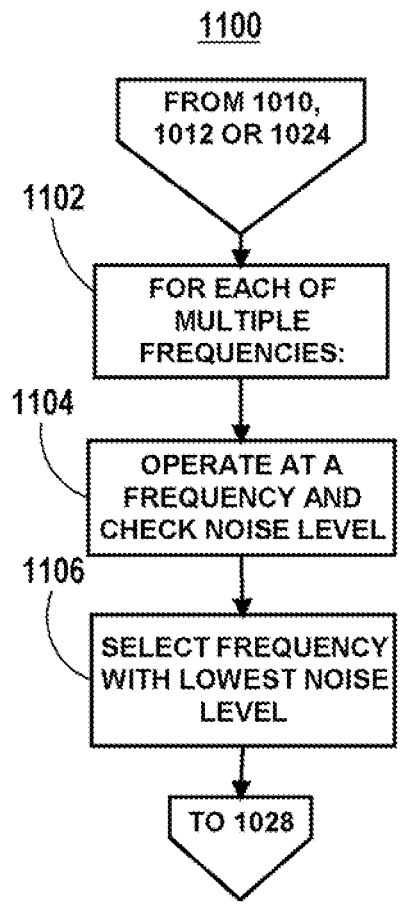
FIG. 11 is a flowchart of a sub-process that can be used in the method depicted in FIG. 10 to select a frequency to be used in operating a touch sensor of a rechargeable device when coupled to a particular battery charger and with a rechargeable battery at a particular battery charge state according to an embodiment.
Figure 12:
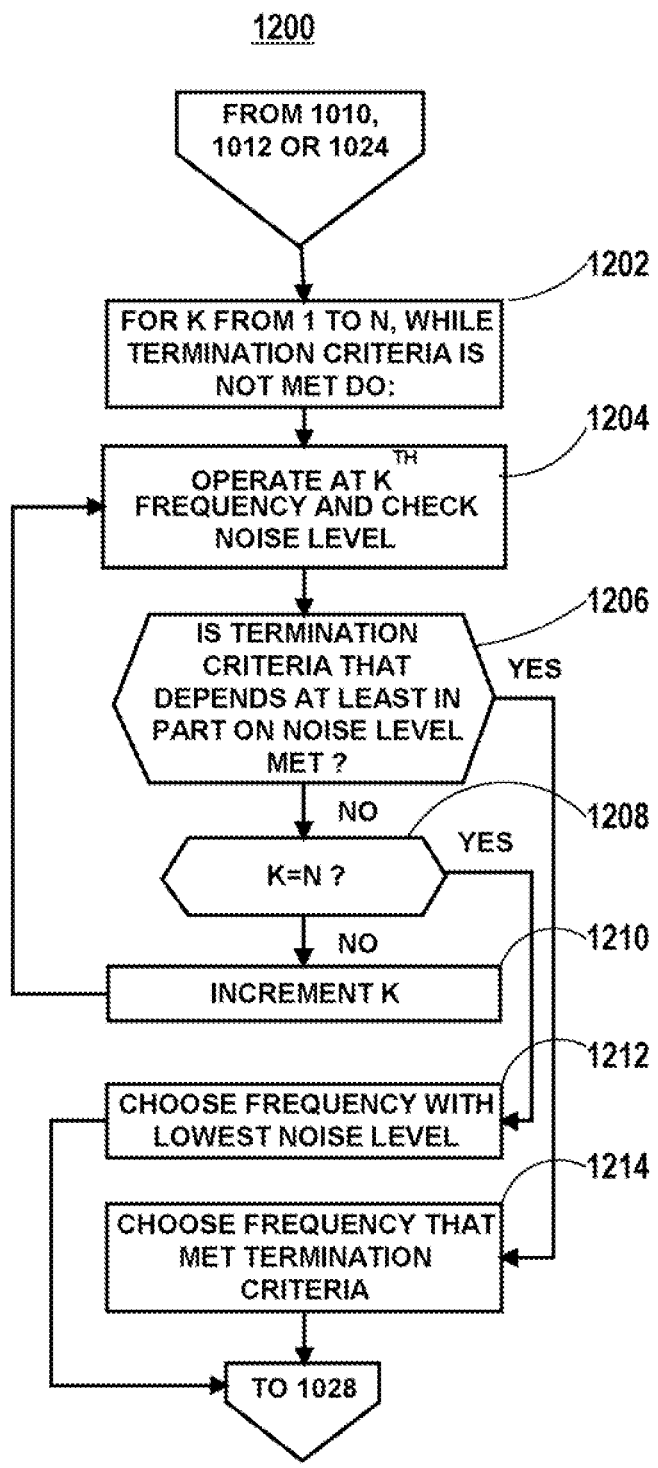
FIG. 12 is a flowchart of a sub-process that can be used in the method depicted in FIG. 10 to select a frequency to be used in operating a touch sensor of a rechargeable device when coupled to a particular battery charger and with a rechargeable battery at a particular battery charge state according to an alternative embodiment.

Referring again to FIG. 10, when the outcome of block 1010 is negative, and also after executing block 1024 the method 1000 determines 1026 an operating frequency that is to be used with the coupled battery charger 224, 602. Methods of determining the operating frequency are shown in FIGS. 11 and 12. The operating frequency will be chosen in order to minimize the effect of interference by noise from the battery charger 224, 602.

FIG. 11 is a flowchart of a sub-process that can be used in the method depicted FIG. 10 to select a frequency to be used in operating a touch sensor of a rechargeable device when connected to a particular battery charger and with a rechargeable battery at a particular battery charge state according to an embodiment. Block 1102 represents the start of a loop structure that executes block 1104 for each of multiple frequencies. In block 1104 the touch sensor 220 is operated at each of multiple frequencies and the noise level is measured. In block 1106. The frequency that yielded the lowest noise is selected.

FIG. 12 is a flowchart of a sub-process 1200 that can be used in the method depicted FIG. 10 to select a frequency to be used in operating the touch sensor 220 of the RTSED 102 when coupled to a particular battery charger 224, 602 and when the rechargeable battery 222 is at a particular battery charge state according to an embodiment.

Block 1202 is the top of a program loop that continues to process each $K^{TH}$ frequency of a plurality of N frequencies until a termination criteria is met. In block 1204 the touch sensor 220 is operated at a $K^{TH}$ frequency and the noise level is checked. Various methods can be used to ascertain the noise level of the touch sensor. One method is to compute the root mean square (RMS) of the touch sensor signal from all addressable sensor coordinates (e.g., XY values) after discarding a certain number (e.g., 2) of the highest values which are assumed to result from actual touches. Next block 1206 is a decision block, the outcome of which depends on whether the aforementioned termination criteria is met. The termination criteria may for example be a requirement that the noise level for the $K^{TH}$ frequency be below a preprogrammed value. If it is determined in decision block 1206 that the termination criteria was met, then the sub-routine 1200 branches to block 1214 in which the frequency that met the termination criteria is chosen. If on the other hand it is determined in block 1206 that the termination criteria was not met, then the sub-routine 1200 continues by testing 1208 whether K=N, i.e. if the last of the plurality of frequencies has been processed by the loop commenced in block 1202. If not then the index K that identifies successive frequencies is incremented 1210 and the sub-routine 1200 loops back to block 1204 to process the next frequency. If, on the other hand, it is determined in block 1208 that the last frequency has been processed, then the sub-routine 1200 branches to block 1212 in which the frequency that yielded the lowest noise level is chosen. After either block 1212 or block 1214 the sub-process 1200 returns to the process 1000 at block 1028.

The frequencies that are checked in sub-processes 1100, 1200 may be pre-screened to exclude frequencies that would interfere with wireless communication bands supported by the transceivers 210 or that correspond to other known fixed noise sources.

Referring again to FIG. 10, in block 1028 a record associating the peripheral ID for the coupled battery charger 224, 602 and the current charge state with the operating frequency determined in block 1026 is stored in the look up table.

In cases that the outcome of decision block 1010 is positive, meaning that the peripheral ID is already listed in the look up table, then the method 1000 continues with decision block 1012 which tests if there is an entry for the current approximate charge state in the look up table. For new battery chargers a corresponding look up table column can be filled in during the course of one complete charging from a fully discharged state to a fully charged state; however, a user may not allow the rechargeable battery 222 to be fully charged or discharged for sometime in which case it will take longer for the corresponding look up table column to be fully populated for all battery charge states. If the outcome of decision block 1012 is negative meaning that there is no entry for the current charge state, then the method branches to block 1026 described above and elaborated upon with reference to FIGS. 11-12.

After completing block 1028 and also when the outcome of block 1012 is positive, the method 1000 continues with block 1014 in which the touch sensor 220 is operated at the frequency found in the look up table corresponding to the peripheral ID of the coupled battery charger 224, 602 and the current charge state.

After a time delay 1016 measured while operating in blocks 1014 and 1018 the method 1000 returns to block 1004 and proceeds as described above.

Although not shown in FIG. 10, according to an optional implementation detail, the look up table can be cleared periodically and subsequently rebuilt per FIG. 10. This will allow values in the look up table to be re-selected which may be called for due to aging of the rechargeable battery 222 or aging of circuit components, e.g., electrolytic capacitors in the battery charger 224, 602 or RTSED 102.

The rechargeable battery 222 charge state is but one example of a measure that is indicative (in this case predictive) of power being drawn from the battery charger 224, 602 that may be read by the main microcontroller 202. Alternatively other measures of power being drawn from the battery charger 224, 602 can be used. For example the current and voltage supplied by the battery charger 224, 602 may be read by the main microcontroller 202 and used to deduce the power being drawn from the battery charger 224, 602.

While embodiments described above a RTSED can infer an identity of a connected battery charger from location information that is deduced by processing received wireless signals, according to alternative embodiments an RTSED can deduce a unique identity of a connected battery charger based on unique information received from another connected device (e.g., a computer monitor) through a wired interface (e.g., an HDMI interface). For example a smartphone RTSED may be used as a computer at both a user's home and office. In this example in each location it is assumed that the smartphone RTSED will be connected to a different 'dumb' battery charger that is incapable of supplying identifying information and in each location the smartphone RTSED will also be connected to a different computer monitor through an HDMI interface. Each monitor equipped with an HDMI interface will supply different E-EDID data to the RTSED, so that the RTSED will be able to distinguish the two location and will assign separate ID's to the two chargers based on the two sets of E-EDID.

It should be observed that the embodiments reside primarily in combinations of method steps and apparatus components related to rechargeable touch sensor devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the described disclosure may be include one or more conventional processors and unique stored program instructions that control the one or more processors to implement, in conjunction with certain non-processor circuits, some, most, or all of the functions of rechargeable touch screen equipped devices described. The non-processor circuits may include, but are not limited to, a radio receiver, a radio transmitter, signal drivers, clock circuits, power source circuits, and user input devices. As such, these functions may be interpreted as steps of a method to perform touch sensing in a rechargeable device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described. Further, it is expected that one of ordinary skill, notwithstanding possibly significant effort and many design choices motivated by, for example, available time, current technology, and economic considerations, when guided by the disclosure concepts and principles will be readily capable of generating such software instructions and programs and ICs with minimal experimentation.

In the foregoing specification, specific embodiments of the present disclosure have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of operating a rechargeable touch screen equipped device, the method comprising:
   determining an identity of a coupled battery charger;
   reading at least one measure indicative of power being drawn by the rechargeable touch screen equipped device from the coupled battery charger;
   checking stored information to determine if there is a record corresponding to the identity and the at least one measure of power being drawn;
   when a record is found: reading configuration information stored in the record and operating a touch sensor at a first frequency based on the configuration information; and
   when a record is not found: selecting a second frequency from a plurality of frequencies and creating a new record in said stored information corresponding to said identity, and corresponding to said measure of power being drawn, said record including configuration information corresponding to said second frequency.

2. The method according to claim 1 wherein reading at least one measure indicative of power being drawn by the rechargeable touch screen equipped device from the coupled battery charger comprises:
   determining a charge state of the rechargeable touch screen equipped device.

3. The method according to claim 1,
   wherein said second frequency is selected to satisfy one or more criteria selected from a group consisting of:
      said second frequency yields a best performance, among said plurality of frequencies, of said touch sensor according to a performance metric, and
      said second frequency yields performance for which said performance metric meets a minimum criteria.

4. The method according to claim 1 wherein determining said identity of said coupled battery charger comprises:
reading identifying information from said coupled battery charger.

5. The method according to claim 1 wherein determining said identity of said coupled battery charger comprises:
reading identifying information from another connected device.

6. The method according to claim 1 wherein determining said identity of said coupled battery charger comprises:
receiving wireless signals and deducing location information from said wireless signals.

7. The method according to claim 6 wherein the receiving wireless signals comprises:
construing received signal strengths of the wireless signals as at least a part of said identity of said coupled battery charger.

8. The method according to claim 6 wherein the receiving wireless signals comprises:
receiving a wireless network device ID and construing the wireless network device ID as a location identifier and using the location identifier as at least a part of said identity of said coupled battery charger.

9. The method according to claim 6 wherein receiving of wireless signals comprises:
receiving a cellular site ID and construing the cellular site ID as a location identifier and using the location identifier as at least a part of said identity of said coupled battery charger.

10. The method according to claim 6 wherein receiving of wireless signals comprises:
receiving information derived from a Bluetooth link key and construing the information derived from the Bluetooth link key as a location identifier and using the location identifier as at least a part of said identity of said coupled battery charger.

11. The method according to claim 1 wherein determining said identity of said coupled battery charger comprises:
checking at least one item of information selected from the group consisting of: the current time and the current day of the week.

12. An apparatus comprising:
a rechargeable battery;
an interface coupled to said rechargeable battery and adapted to couple to each of a plurality of external battery chargers;
a touch sensor;
a memory;
at least one controller coupled to said touch sensor and said rechargeable battery, wherein said at least one controller is configured to:
deduce an identity of each of said plurality of external battery charger coupled to said interface;
read at least one measure indicative of power being drawn by the apparatus from each of the plurality of external battery chargers;
check stored information in said memory to determine if there is a record corresponding to the identity and the power being drawn;
when a record is found: read configuration information stored in the record and operate the touch sensor at a first frequency based on the configuration information;
when a record is not found: select a second frequency from a plurality of frequencies and create a new record in said stored information corresponding to said identity, and corresponding to said at least one measure indicative of power being drawn said including configuration information corresponding to said second frequency.

13. The apparatus according to claim 12 wherein in reading at least one measure indicative of power being drawn by the apparatus from each of the plurality of external battery chargers, said apparatus is configured to:
determine a charge state of said rechargeable battery.

14. The apparatus according to claim 12 wherein in selecting said second frequency said at least one controller is configured to:
select said second frequency such that said second frequency satisfies one or more criteria selected from a group consisting of:
said second frequency yields a best performance, among said plurality of frequencies, of said touch sensor according to a performance metric, and
said second frequency yields performance for which said performance metric meets a minimum criteria.

15. The apparatus according to claim 12 further comprising:
a wireless receiver and
wherein said at least one controller is configured to determine said identity of at least a first subset of said plurality of external battery chargers coupled to said interface by:
receiving information from said wireless receiver,
deducing location information from said information, and
construing said information as at least a part of said identity.

16. The apparatus according to claim 15 wherein said wireless receiver comprises a global positioning satellite receiver.

17. The apparatus according to claim 15 wherein said wireless receiver comprises a wireless network receiver.

18. The apparatus according to claim 15 wherein said wireless receiver comprises a cellular receiver.

19. The apparatus according to claim 15 wherein said at least one controller is coupled to said interface and said at least one controller is adapted to:
receive identifying information from at least a second subset of said plurality of external battery chargers through said interface.

20. The apparatus according to claim 12 wherein said at least one controller comprises:
a touch sensor controller coupled to said touch sensor;
a battery charge controller coupled to said rechargeable battery; and
a main controller coupled to said touch sensor controller and said battery charge controller.

* * * * *